United States Patent [19]

Yamakoshi

[11] Patent Number: 4,716,814
[45] Date of Patent: Jan. 5, 1988

[54] MUFFLER FOR BRAKE BOOSTER SYSTEM
[75] Inventor: Mutsuro Yamakoshi, Sakado, Japan
[73] Assignee: Jidosha Kiki Co., Ltd., Japan
[21] Appl. No.: 699,017
[22] Filed: Feb. 7, 1985
[30] Foreign Application Priority Data Feb. 9, 1984 [JP] Japan ............... 59-17197[U]

[51] Int. Cl.⁴ .......................... F15B 9/10; F01N 1/24
[52] U.S. Cl. .................... 91/376 R; 92/78; 181/258
[58] Field of Search ............. 91/369 A, 376 R; 92/48, 92/99, 78, 98 D; 137/560; 181/230, 237, 254, 258

[56] References Cited

U.S. PATENT DOCUMENTS

| | | | |
|---|---|---|---|
| 2,328,236 | 8/1943 | Stoner | 181/230 X |
| 2,748,883 | 6/1956 | Ralph | 181/258 |
| 3,809,179 | 7/1974 | Delaney, Jr. et al. | 181/230 |
| 3,949,828 | 4/1976 | Frochaux | 181/230 |
| 4,022,112 | 5/1977 | Putt et al. | 91/369 A X |
| 4,274,258 | 6/1981 | Shirai et al. | 91/369 A X |
| 4,316,523 | 2/1982 | Boretti | 181/258 X |
| 4,318,335 | 3/1982 | Wiegand et al. | 91/369 A |
| 4,345,506 | 8/1982 | Ohomi | 91/376 R |
| 4,346,783 | 8/1982 | Scarton et al. | 181/237 X |
| 4,494,443 | 1/1985 | Tsubouchi | 91/369 A |
| 4,512,237 | 4/1985 | Endoh et al. | 92/48 X |
| 4,557,179 | 12/1985 | Takeuchi et al. | 92/99 X |
| 4,567,812 | 2/1986 | Weiler et al. | 92/98 D X |
| 4,617,858 | 10/1986 | Hachiro | 92/98 D X |

Primary Examiner—Robert E. Garrett
Assistant Examiner—George Kapsalas
Attorney, Agent, or Firm—McGlew and Tuttle

[57] ABSTRACT

A muffler device for use in a brake booster system in which there are inserted in an air suction passage cylindrical noise shielding member having at one end an outer flanged portion extending radially outwardly and at the other end an inner flanged portion extending radially inwardly, the circumferential wall of the noise shielding means being defined with an air suction opening; and cylindrical noise absorbing member with a gas permeability being inserted into the inner circumference of the circumferential wall, in such a manner that noises as generated at the valve mechanism during the operation of the brake booster may effectively be prevented from propagating to the outside by aid of the noise shielding member and the noise absorbing member together.

7 Claims, 3 Drawing Figures

MUFFLER FOR BRAKE BOOSTER SYSTEM

BACKGROUND OF THE INVENTION

1. Field of the Invention

The present invention relates generally to a muffler for a brake booster, and more particularly to a muffler device for use with a brake booster system which comprises, in combination, a cylindrical noise shielding member having a radially outwardly extending flanged portion and a radially inwardly extending flanged portion formed respectively at the front and rear ends thereof, and a cylindrical noise absorbing member having an appropriate air permeability.

2. Description of the Prior Art

The typical construction of a brake booster, which is generally known in the art of pneumatic brake systems is such that a power piston is slidably mounted for reciprocating motion in a housing and is adapted in function to urge a master cylinder piston in the housing. A constant pressure chamber and a variable pressure chamber are formed in front of and behind the power piston, respectively. The power piston is provided with a first valve which is adapted to open and close a passage communicating the constant pressure chamber with the variable pressure chamber and a second valve is adapted to open and close a passage communicating the variable pressure chamber with the atmosphere. These first and second valves are slidably mounted in the inside of the power piston and are adapted to be controlled for opening and closing motion with the forward and reverse motions of a plunger which is operatively connected through an input rod to a brake pedal. More specifically, according to the typical construction of a booster or amplifier mechanism of the vacuum-operated type, the constant pressure chamber as noted above is constantly exposed to a negative pressure, and when the brake pedal is stepped on so as to have the input rod in reciprocating motion, the plunger is caused to move forwardly to close the first valve, and concurrently to open the second valve introducing atmospheric pressure into the variable pressure chamber. This results in a reciprocating motion of the power piston. On the other hand, it is constructed to operate in such a manner that when releasing the brake pedal from its stepped on position, the input rod is forced backward under the urging effort of a return spring so as to have the plunger move in reverse motion, thereby letting the first valve open and at the same time the second valve close so as to dissolve the differential pressure existing between the constant pressure chamber and the variable pressure chamber, and thereby let the power piston moved in returning motion by function of its return spring.

With such a typical construction the brake booster system has a tendency to produce a relatively high level of air intake or suction noise at the variable pressure chamber into which the atmosphere is sucked rapidly from the second valve, when the second valve is opened by stepping down on the brake pedal. This tendency cannot be avoided easily. Also, since the brake booster is located generally in the vicinity of the driver's seat in the vehicle cabin, it is desirable to reduce this noise for prevention of such air suction noises from propagating in and about the environment of the vehicle cabin. In the conventional way of coping with such problem, it was a typical practice to use a certain acoustic material, such as felt texture or the like, as packing for the air suction passage in the inside of a power piston structure in the attempt to somehow absorb such noises from being scattered around in the environment. However, with the use of a too thick acoustic material packings for the air intake passage of the system for the purpose of attaining in haste an effective result of absorbing such air suction noises, there would undoubtedly be produced an undesired effect of resistance against air suction in the air suction passage, which would naturally bring a poor response in operation of the brake booster, and which would eventually result in a very possible delay in the working of the brake when put to use. Such problem would grow still worse in the case of the tandem type brake booster which has a relatively large volume for its variable pressure chamber. A countermeasure for this type of booster has been left unattended accordingly.

The present invention is essentially directed to the provision of an improved muffler device to overcome such inconveniences and difficulties in practice as outlined above and experienced in the use of the conventional muffler for use with the brake booster system.

SUMMARY OF THE INVENTION

It is therefore a primary object of the present invention to provide an improved muffler arrangement for use with brake booster system which is advantageous in the provision of a relatively small resistance in the suction of air in the air suction passage in the inside of the power piston of the brake booster, and also in the provision of an efficient effect of muffling or bringing under control noises produced in the suction of air in the brake booster system. As summarized in brief the invention includes a power piston disposed slidably in reciprocating motion in the interior of an enclosed housing, the power piston being at its frontal end connected to an output rod mounted slidably along the axis of the system and extending through the front wall surface of the housing, and having at its rear end an integral cylindrical portion mounted slidably along the axis of the system and extending through the rear wall surface of the housing. The housing defines a constant-pressure chamber into which a predetermined negative pressure is normally introduced and a variable pressure chamber communicating selectively with the constant pressure chamber or the atmosphere by way of a valve mechanism disposed in the cylinder portion of the power piston. Both chambers are defined respectively on the front and rear sides of the power piston, the valve mechanism being controlled in valving function by an operation of an input rod installed in the interior of the cylindrical portion of the power piston. When the power piston moves in its forward stroke motion, the atmospheric air is sucked into the variable pressure chamber by way of the rear opening of the cylindrical portion through the valve mechanism. The valve mechanism comprises, in combination, cylindrical noise shielding means having at one end an outer flanged portion extending radially outwardly and at the other end an inner flanged portion extending radially inwardly, adapted to be inserted in position between the inner circumferential surface of the cylindrical portion and the outer circumferential surface of the input rod, the outer circumference of the outer flange portion being operatively fitted snugly into the inner circumference of said cylindrical portion. The inner circumference of the inner flanged portion is disposed in sliding contact relationship with the outer circumferential surface of the input rod, the circumferential wall of the noise shielding means being defined with an air suction opening. Cylindrical noise absorbing means with gas permeability, are inserted in an operative position on the inner circumference of the circumferential wall.

As summarized by way of a preferred embodiment of the present invention, since the brake booster system is equipped with the muffler device which comprises, in combination, the noise shielding member and the noise absorbing member, and which is inserted in position into the inside of the cylindrical portion of the power piston, and wherein the air suction passage is bent in its profile with the employment of the flanged portion of the above mentioned noise shielding member, when there occurs any air suction noises at the valve mechanism disposed in the above mentioned cylindrical portion, such noises may effectively be blocked by function of the flanged portion so as to be attenuated eventually. In addition, thus-attenuated noises of air suction may further be subjected to the effect of absorption by way of the noise absorbing member, thus finally resulting in a substantial extent of reduction of the air-suction noises. Also, by virtue of the employment of the above noted noise absorbing member of cylindrical shape, a large flow area is available for the passage of air sucked, thus a small resistance against the air passage therethrough is achieved. As a consequence, therefore, of such an advantageous construction, a ready and smooth introduction of air into the variable pressure chamber is ensured in the brake booster, even with a relatively thick formation of the noise absorbing member to be used, which would successfully eliminate the possibility of spoiling the due response of operation of the brake booster system. Furthermore, the muffler device according to the present invention is of the cartridge type so that the noise absorbing member can simply be inserted into the interior of the noise shielding member. This has the advantage that installation or maintenance work on the muffler device, may be made with ease.

Any other objects, principles, properties and details of the present invention, as well as advantages thereof, will become more apparent from the following detailed description by way of a preferred embodiment of the invention, when read in conjunction with the accompanying drawings.

BRIEF DESCRIPTION OF THE DRAWING

The present invention will now be explained by way of a preferred embodiment thereof as adapted in practice to the tandem type brake booster system in reference to the attached drawings herewith.

In the drawings.

DETAILED DESCRIPTION OF THE PREFERRED EMBODIMENTS

Figure 1:
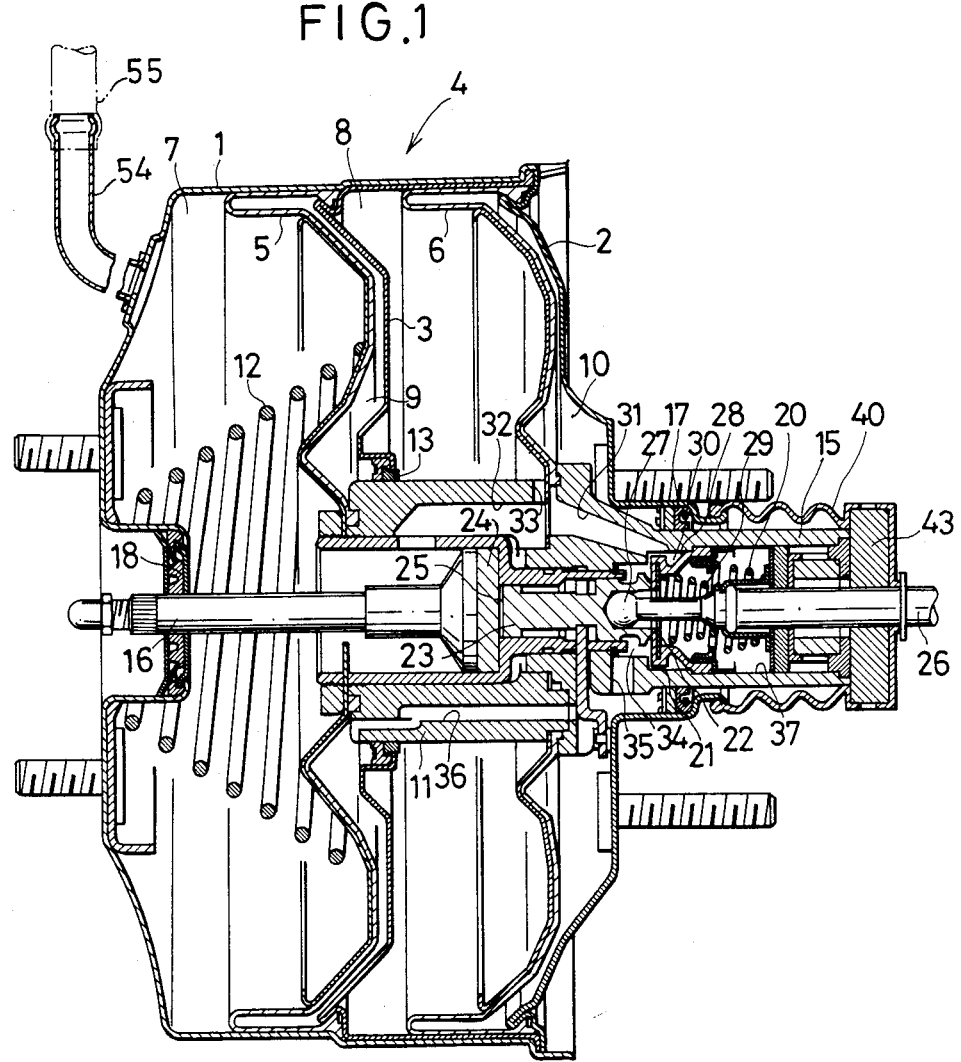
FIG. 1 is a general view showing, in longitudinal cross-section, the typical construction of a brake booster system.

Now, referring to FIG. 1, there is shown, by way of a preferred embodiment of the present invention, the general construction of an improved brake booster system, in which there are provided a front housing 1, a rear housing 2, and a partition plate 3. The housings 1 and 2 are fitted together to define an enclosed housing as designated generally at 4. The interior of thus-formed housing 4 is partitioned or divided into front and rear compartments by way of the partition plate 3. It is shown that these two compartments are further divided into constant-pressure chambers 7, 8 and variable-pressure chambers 9, 10 disposed respectively in paired relationship with each other in the longitudinal or axial direction of the brake booster system by way of a pair of diaphragms 5, 6 also disposed longitudinally along the axis of the system. A power piston 11 is provided which is adapted to move in its forward stroke toward the left as viewed in FIG. 1 by function of a differential pressure existing between the constant pressure chambers 7, 8 and the variable pressure chambers 9, 10. On the other hand, there is operatively installed a return spring 12 in the constant pressure chamber 7, which is constructed in such a manner that when a differential pressure between the pairs of the constant pressure chambers 7, 8 and the variable pressure chambers 9, 10 is dissolved or eliminated during the operation, the power piston 11 is cuased to move in its returning stroke toward the right as viewed in FIG. 1 by the urging effort of the return spring 12. A seal 13 is installed on the inner circumference of the partition plate 13, with which seal the outer circumference of the power piston 11 is sealed properly.

The power piston 11 has on its rear end side a cylindrical portion 15 of integral construction, this cylindrical portion 15 being mounted slidably along the axis of the system and extending axially through and out of the rear housing 2. An output rod 16 is operatively mounted ahead of the power piston 11 in such a manner that it is mounted slidably in the axial direction of the system and extending through and out of the front housing 1. It is seen that the sliding surfaces of the cylindrical portion 15 and the push rod 16 are operatively sealed by way of seals 17, 18, respectively.

It is also seen that there are incorporated a first valve 21 adapted to open or close a passage intercommunicating the constant pressure chambers 7, 8 and the variable pressure chambers 9, 10, and a second valve 22 adapted to open or close a passage intercommunicating the variable pressure chambers 9, 10 and the atmosphere, respectively, in the inside of the power piston 11 noted above. These two valves 21, 22 are operatively controlled in their valving function with the forward and rearward motions of a plunger 23 which is mounted slidably in position to the interior of the power piston 11. This plunger 23 is operatively connected to the output rod 16 through a rubber cushion element 24 and a gap 25 defined between the end faces of the plunger 23 and the rod 16.

More specifically, the leading end of the input rod 26, which is interconnected to a brake pedal (not shown), is operatively connected to the plunger 23 through a ball joint 27. This input rod 26 is constantly biased toward the right as viewed in FIG. 1 by the urging effort of a return spring 20, whereby the plunger 23 is likewise biased in the same direction. There is an annular seat portion formed at the rear end of the plunger 23, and also there is disposed a rubber poppet valve 28 of annular shape in the rear position of this seat portion. The poppet valve 28 and the above mentioned seat portion of the plunger 23 serve in combination to form the second valve 22. There is an annular seat portion formed in the inner circumferential wall of the cylindrical portion 15 in front of the poppet valve 28, which serves in combination with the poppet valve 28 to form the first valve 21. It is constructed that the poppet valve 28 is constantly biased in the forward direction by the urging force of a compression spring 29 so that the second valve 22 is normally placed in a fully closed position under this urging effort (at the backward or returning stroke of the power piston 11), and that the first valve 21 is in its partly opened position with a predetermined gap.

There is a space defined in the outer circumference of the poppet valve 28 in communication with the one constant pressure chamber 7 through passages 31, 32 communicating therebetween, the other constant pressure chamber 8 communicating with the constant pressure chamber 7 through passages 32, 33 communicating therebetween. In addition, there is also a space 34 defined in the outer circumference of the plunger 23 in communication with the variable pressure chambers 9, 10 through similar passages 35, 36 defined in the power piston 11. With such construction, when the first valve 21 is opened, there is an intercommunication between the constant pressure chambers 7, 8 and the variable pressure chambers 9, 10 by way of these passages 31 through 33 and 35, 36, while with the second valve 22 opened, there is now another intercommunication between the variable pressure chambers 9, 10 and the atmosphere by way of the passages 35, 36 and the passage 37 in the cylindrical portion 15, respectively.

Figure 2:
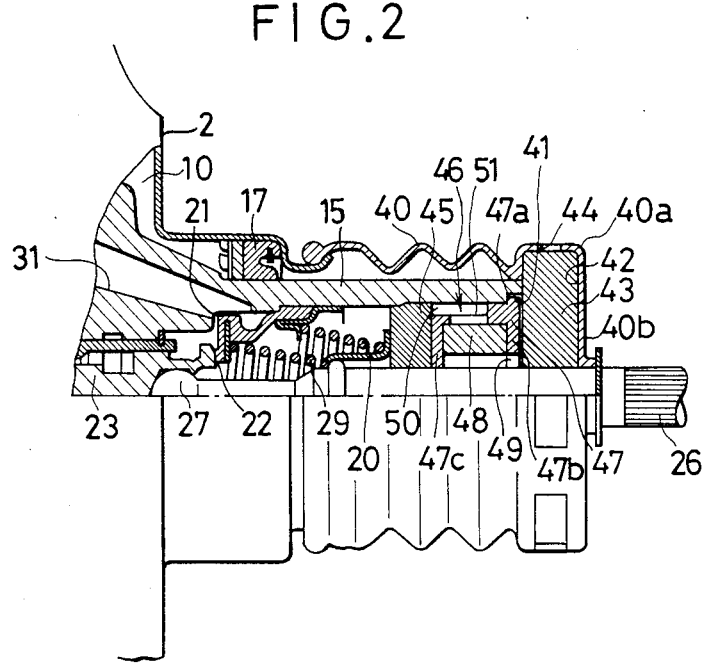
FIG. 2 is an fragmentary view showing, in like longitudinal cross-section, the upper half of the brake booster system.

The cylindrical portion 15 of the power piston 11 extending outwardly from the rear housing 2 is, as typically shown in FIG. 2, covered by a rubber boot 40, which is expandable in the axial direction, so that the outer circumferential surface of the cylindrical portion 15 may assuredly be protected from the foreign matter such as dusts, water drop, etc. The rear end portion of this boot 40 extends over a little more extension beyond the rear end of the cylindrical portion 15, with which there is defined an open space or chamber 42 by a rear circumferential wall portion 40a and an end wall portion 40b of the boot 40 around the end opening 41 of the cylindrical portion 15. There is an air filter element 43 filled up in the interior of the open chamber 42. Also, there are a plurality of ventilation holes 44 along the circumference of the rear circumferentially wall portion 40a of the boot 40.

Figure 3:
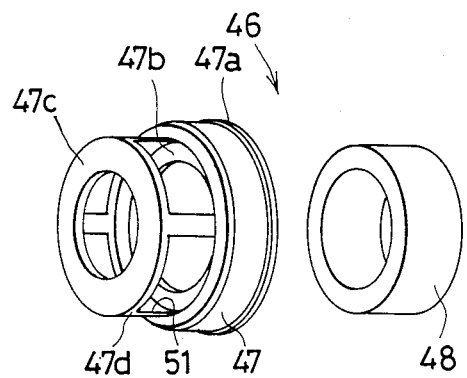
FIG. 3 is an exploded perspective view showing the muffler device alone by way of a preferred embodiment of the invention.

In the passage 37 of the cylindrical portion 15, there is inserted another air filter 45 in a position at a small distance away from the above mentioned air filter 43, as shown in FIG. 2. There is also disposed a muffler device 46 according to the present invention in position intermediate air filter 45 and the outer air filter 43. This muffler device 46 comprises, in combination, a cylindrical noise shielding member 47 which is integrally formed from a synthetic rubber and a cylindrical noise absorbing member 48 made of a material having an appropriate gas permeability such as felt or like textures. Input or operating rod 26 extends slidably along the axes of the air filters 43, 45 and the muffler device 46. As shown more specifically in FIG. 3, the noise shielding member 47 is formed with an outer flanged portion 47a at the rear extending radially outwardly and an inner flanged portion 47b at the rear thereof extending radially inwardly. The outer circumference of the outer flanged portion 47a fits operatively in position into the inner circumference of the rear end opening 41 of the cylindrical portion 15. The inner circumference of the inner flanged portion 47b extends radially inwardly a little short of the outer circumferential surface of the input rod 26, thereby providing a first annular opening 49 for introducing air into the muffler device. An inner flanged portion 47c extends radially inwardly at the frontal end of the noise shielding member 47 with its inner circumference extending to an extent enough to come into a contact relationship with respect to the outer circumference of the input rod 26. Around the outer circumference of the inner flanged portion 47c, there is also defined a second annular opening 50 for taking air. There are provided a plurality of ventilation holes 51 in the circumferential wall portion 47d of the noise shielding member 47 along its circumference, the noise absorbing member 48 being inserted snugly in operative position in the inside of the ventilation holes 51.

With the general construction of the tandem-type brake booster and of the muffler device according to the present invention as fully stated hereinbefore, it is seen in FIG. 1 that the constant pressure chamber 7 is operatively connected by way of a pipe fitting 54 and a tubing 55 with a source of a predetermined negative pressure such as the air intake port of the engine (not shown). Also, as the constant pressure chamber 8 is connected in communication with the constant pressure chamber 7 by way of the passages 32, 33, these constant pressure chambers 7, 8 are normally put under thus-generated negative pressure conditions. When the brake booster system is not in operation, the urging effort of the return spring 20 works upon the poppet valve 28 through the function of the input rod 26 and the plunger 23, and the first valve 21 is opened against the resilient force of the compression spring 29, as typically shown in FIG. 2. At this moment, the negative pressure condition existing currently in the constant pressure chambers 7, 8 is also relayed to the variable pressure chambers 9, 10 through the passage 31, 32, 35, 36, and as there exists no difference in pressures between the both chambers 7, 8, the power piston 11 is then caused to return to its right position as viewed in FIG. 1 under the biasing effect of the return spring 12.

In the next step, when the brake pedal is stepped down on so as to cause the input rod 26 to be moved toward the left as viewed in FIG. 1, as the plunger 23 moves toward the left as viewed in FIG. 1, the first valve 21 is now closed under the biasing effort of the compression spring 29, which will concurrently cause the plunger 23 and the poppet valve 28 to depart away from each other so as to have the second valve 22 opened in response. In such operating position, there is induced air by way of the ventilation holes 44 in the boot 40, then introducing the atmospheric air passing through the air filters 43, 45 and the muffler device 46 into the variable pressure chambers 9, 10 by way of the passages 35 through 37, respectively, thus causing the power piston 11 to be moved in its forward stroke against the biasing effort of the return spring 12 under the effect of differential pressure existing currently between the constant pressure chambers 7, 8 and the variable pressure chambers 9, 10.

With a relatively small degree of opening at the second valve 22 and with a relatively large volume in the variable pressure chambers 9, 10, air is introduced at a substantially great velocity through the second valve 22 so as to possibly generate large suction noise. While suction noises of air would then tend to expand and propagate to the outside after passing through the passage 37 in the cylindrical portion 15, the major part of such noises will efficiently be prevented from propagating any further at the point of the flanged portions 47a, 47c of the noise shielding member 47, by the muffler device 46 placed intermediate the air filters 43 and 45. In addition to this particular effect, by virtue of the specific arrangement which is bent in zig-zag fashion of the path of suction air, that is, from the first annular air suction opening 49 through the ventilation holes 51 to the second annular opening 50, should part of the suction air noises be let through the second annular opening 50, such noises will effectively be put to be muffled or attenuated while passing through thus-formed zig-zag path of suction air. Also with the addition of the noise absorbing member 48 on way to such attenuating process, it is ensured that the suction air noises which would reach the open chamber 42 in the air filter 43 disposed on the outside will eventually grow to be substantially silent. Also, by virtue of such an advantageous arrangement that there is disposed the end wall portion 40b of the boot 40 over the extension of the first annular air suction opening 49, and that the extension of the ventilation holes 44 which open to the atmosphere is at the right angles with that of the first annular air suction opening 49, it may produce an additional effect that any noises of such air would further be attenuated, accordingly. In this connection, it is a matter of course that these air filters 43, 45 may also effect a certain degree of attenuation of such noises, in addition to the very effect attained from the muffler device 46 alone.

As fully explained hereinbefore, it is noted that the muffler device 46 according to the present invention exhibits a remarkably excellent noise muffling performance, and in addition, a prominent effect of permeability of the suction air, as well. In comparison, according to the conventional noise muffler arrangement, it is generally of such construction that there is provided the noise absorbing element of a disc shape between the air filter elements 43, 45 in the so-called sandwiched fashion. With such an arrangement, permeability of suction air would be reduced by the use of a relatively thick noise absorbing element, thus hampering a ready and smooth effect of air suction into the variable pressure chambers 9, 10 and thus spoiling the eventual response in operation of the entire brake booster system. In contrast, the muffler device 46 according to the present invention has an advantageous relatively large area of passage available for the suction air and hence a very small resistance to air suction by virtue of the adaptation of the noise absorbing member 48 of cylindrical shape with a high gas permeability for the incorporation in the muffler device 46. With such advantageous features particular to the present invention, it is to be noted that there will eventually be no fear of reduction of response in operation of the entire brake booster system with an ensured high performance of air introduction to the variable pressure chambers 9, 10, even with the use of a relatively thick noise absorbing member 48, at all.

While the present invention has been explained by way of the specific preferred embodiment thereof, it is to be understood that many changes and modifications may be made in the foregoing teaching without any restriction thereto and without departing from the spirit and scope of the invention. For instance, it is notable that the muffler device 46 may be disposed in the opposite way around to the disposition shown in FIG. 2, which may still ensure the like noise muffling effect, accordingly. In addition, the muffler device 46 may be located in any other places, if necessary, in the air suction passage of the system, than in position between the air filters 43 and 45. It is also notable that the present invention may well be adapted not only to the tandem type construction, but also to the single type construction of the brake booster system, as well.

Finally, it is intended that all the matter contained in the foregoing description or shown in the accompanying drawings shall be interpreted as illustrative and not in any way limiting sense.

It is also to be understood that the appended claims are intended to cover all of such generic and specific features particular to the invention as disclosed herein and all statements relating to the scope of the invention, which as a matter of language might be said to fall thereunder.

What is claimed is:

1. A muffler device in combination with a brake booster system comprising: an axis, a power piston disposed slidably in reciprocating motion in the interior of an enclosed housing having a front wall and a rear wall, the power piston being at its front end connected to an output rod mounted slidably along the axis of the system and extending through the front wall of the housing; an integrally mounted cylindrical portion slidably mounted at a rear end along the axis of the system and extending through the rear wall of the housing; a constant-pressure chamber defined by the housing into which a predetermined negative pressure is normally introduced; a variable pressure chamber communicating selectively with the constant pressure chamber or the atmosphere by way of a valve mechanism disposed in the cylindrical portion of the power piston an input rod, adapted to control the valve mechanism in its valving function, positioned in the interior of the cylindrical portion of the power piston, the valve mechanism being constructed so that when the power piston moves in a forward stroke, toward the front wall, atmospheric air is sucked into the variable pressure chamber by way of a rear opening of the cylindrical portion through the valve mechanism; muffler means, positioned between the inner circumferential surface of said cylindrical portion and the outer circumferential surface of the input rod, for re-directing atmospheric air substantially ninety degrees from an input direction, and for re-directing the re-directed atmospheric air substantially ninety-degrees from the re-directed direction so as to bend the air twice at right angles in order to shield from noise the exterior of the housing.

2. A muffler device for use in a brake booster system having an axis and including a power piston disposed slidably in reciprocating motion in the interior of an enclosed housing having a front wall and a rear wall, the power piston being at its front end connected to an output rod mounted slidably along the axis of the system and extending through the front wall of the housing, and having at its rear end an integrally formed cylindrical portion mounted slidably along the axis of the system and extending through the rear wall of the housing, the housing defining a constant-pressure chamber into which a predetermined negative pressure is normally introduced and a variable pressure chamber communicating selectively with the constant pressure chamber or the atmosphere by way of a valve mechanism disposed in the cylinder portion of the power piston, the valve mechanism being controlled in its valving function by an input rod installed in the interior of the cylindrical portion of the power piston, and wherein the valve mechanism is constructed so that when the power piston moves in a forward stroke toward the front wall, atmospheric air is sucked into the variable pressure chamber by way of a rear opening of the cylindrical portion through the valve mechanism, the muffler device comprising: a thin cylindrical noise shielding member formed of rubber into one body having at one end an outer flanged portion extending radially outwardly and at another end an inner flanged portion extending radially inwardly, said shielding member being insertable into a position between the inner circumferential surface of said cylindrical portion and the outer circumferential surface of said input rod, the outer circumference of said outer flange portion being operatively fitted snugly into the inner circumference of said cylindrical portion, a clearance is formed between the inner circumference of said outer flange portion and the outer circumferential surface of said input rod, the inner circumference of said inner flange portion being disposed in sliding contact relationship with the outer circumferential surface of said input rod, a clearance is formed between the outer circumference of said inner flanged portion and the inner circumferential surface of said cylindrical portion, the circumferential wall of said noise-shielding means being defined with an air suction opening; and, cylindrical noise absorbing gas-permeable member operatively positioned within the inner circumference of said circumferential wall.

3. A muffler device for use in a brake booster system having an axis and including a power piston disposed slidably in reciprocating motion in the interior of an enclosed housing having a front wall and a rear wall, the power piston being at its front end connected to an output rod mounted slidably along the axis of the system and extending through the front wall of the housing, and having at its rear end an integrally formed cylindrical portion mounted slidably along the axis of the system and extending through the rear wall of the housing, the housing defining a constant-pressure chamber into which a predetermined negative pressure is normally introduced and a variable pressure chamber communicating selectively with the constant pressure chamber or the atmosphere by way of a valve mechanism disposed in the cylinder portion of the power piston, the valve mechanism being controlled in its valving function by an input rod installed in the interior of the cylindrical portion of the power piston, and wherein the valve mechanism is constructed so that when the power piston moves in a forward stroke toward the front wall, atmospheric air is sucked into the variable pressure chamber by way of a rear opening of the cylindrical portion through the valve mechanism, the muffler device comprising: a cylindrical noise shielding member having at one end an outer flanged portion extending radially outwardly and at the other end an inner flanged portion extending radially inwardly, and inserted in position between the inner circumferential surface of said cylindrical portion and outer circumferential surface of the input rod, the outer circumference of said outer flanged portion being operatively fitted snugly into the inner circumference of said cylindrical portion, the inner circumference of said inner flange portion being disposed in sliding contact relationship with the outer circumferential surface of said input rod, said noise shielding member having a circumferential wall between said flanged portions, said circumferential wall having an air suction opening; and cylindrical noise absorbing means with a gas permeability inserted in an operative position on an inner circumference of said circumferential wall.

4. The muffler device for use in the brake booster system as claimed in claim 3 wherein said noise shielding member is formed integrally as one piece from a synthetic rubber, and wherein said noise absorbing means are formed from a felt.

5. The muffler device for use in the brake booster system as claimed in claim 3 or 4 wherein there are provided air filter means on the front and rear side of said noise shielding member, respectively.

6. A muffler device for use in the brake booster system as defined in claim 3 or 4 wherein said outer flanged portion extending radially outwardly is formed at the rear end of said noise shielding member, said inner flanged portion extending radially inwardly at a front end of said noise-shielding member, said muffler device including a second inner flanged portion extending radially inwardly at the rear end of said noise-shielding member, said second inner flanged portion having an inner circumference spaced away from the input rod to form a first annular space therewith for the sucking of atmospheric air into said noise-shielding member on an inner circumference of said cylindrical noise-absorbing means, said circumferential wall of said noise-shielding member being spaced inwardly from said cylindrical portion of the power piston at the front end of said noise-shielding member to form a second annular opening for the passage of atmospheric air from said cylindrical noise-absorbing means.

7. A muffler device according to claim 6, including air filter means on the front and the rear sides of said noise-shielding member, respectively.

* * * * *